June 25, 1929.  H. J. MURPHY  1,718,575
LUBRICATING APPARATUS
Filed Jan. 9, 1926
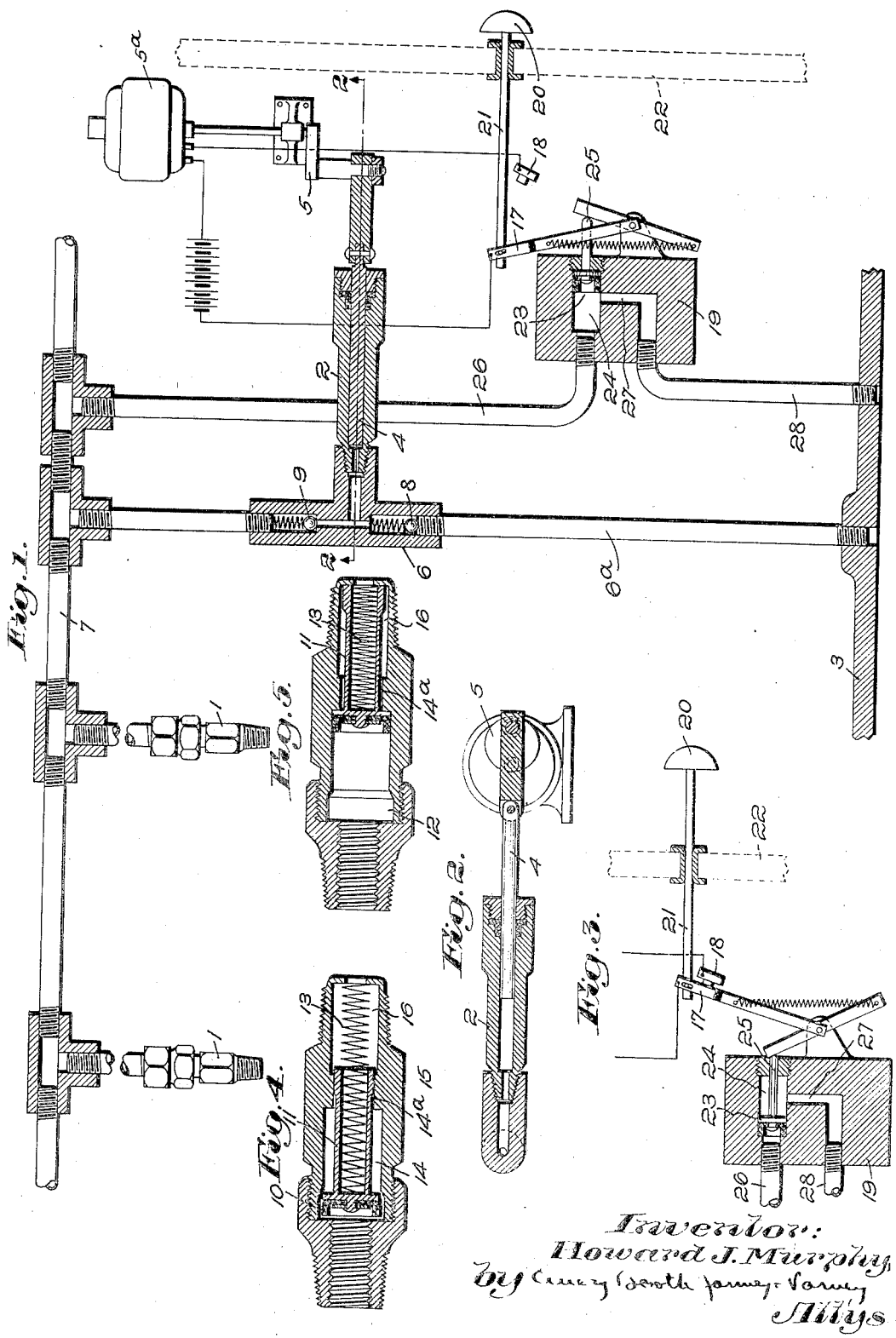
Inventor:
Howard J. Murphy Patented June 25, 1929.

1,718,575

UNITED STATES PATENT OFFICE.

HOWARD J. MURPHY, OF READING, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Application filed January 9, 1926. Serial No. 80,243.

This invention aims to provide improvements in lubricating apparatus.

In the drawings which illustrate a preferred embodiment of my invention,

Figure 1 is a diagrammatic layout of a preferred form of lubricating system, showing parts of the system in cross-section;

Fig. 2 is a section on the line 2—2 of Fig. 1, being partly in elevation;

Fig. 3 is a detail view of the switch showing the relation of the cooperating parts after the button on the dash has been pulled to start the motor;

Fig. 4 is a section through one of the lubricant-measuring pressure-multiplying devices showing the position of the parts when the measuring chamber is being filled with lubricant; and Fig. 5 is a section similar to Fig. 4 but showing the relation of parts when the lubricant has been forced to the part to be lubricated.

Referring to the drawings, I have illustrated a central lubricating system which is particularly useful in connection with lubricating various bearings of a motor vehicle. The system includes lubricant-measuring devices or cups 1 located adjacent to the parts to be lubricated, a motor driven pump 2 for supplying lubricant to the cups, a supply reservoir 3 and a pipe system connecting the cups with the pump and the pump with the reservoir.

Any suitable reservoir may be provided for the lubricant supply, but I have illustrated in cross-section a portion of the crankcase of the motor of the vehicle so as to show that lubricant may be supplied to the pump from that source thereby eliminating the added expense of installing a separate tank.

The pump 2 is illustrated as a relatively small piston pump having the piston 4 driven through an eccentric 5 by a small electric motor 5ª. A T 6 is secured to the end of the pump 2. A suitable pipe 6ª connects the crankcase with one end of the T as illustrated, while a pipe system 7 connects the remaining end of the T with the various cups 1. The T 6 is chambered to receive a spring-pressed ball check valve 8 to prevent return of lubricant through the pipe 6ª and is also chambered to receive a second spring-pressed ball check valve 9 to prevent return of lubricant from the pipe system 7 to the pump 2.

Each lubricant device or cup 1 has a bore in which a combined piston 10 and piston stem 11 may reciprocate to force a predetermined quantity of lubricant under pressure from the cup. The bore varies in diameter from the inlet to the outlet end of the cup to provide a space 12 around the piston when urged into its normal position by the spring 13. Beyond the space 12 the bore provides a measuring chamber 14, while beyond this chamber the bore is reduced to provide a wall 14ª with which the end 15 of the piston stem normally engages to prevent direct passage of lubricant from the chamber to the outlet passage 16. The outlet passage is located just beyond the wall which contacts with the end of the piston stem.

The means for starting and stopping the electric motor for operating the pump 2 includes a snap switch device which carries one of the contacts 17 for making and breaking the circuit with the stationary contact 18 to start and stop the motor 5ª. This snap switch is mounted for operation upon a cylinder block 19 as illustrated in Fig. 1. The switch is operated in one direction by pulling upon a button 20 at the end of a rod 21 which passes through the dash 22 of the motor vehicle, for convenient operation, and is secured to one of the pivoted arms of the snap switch. The switch is operated in the opposite direction by a piston 23 reciprocable in a chamber 24 in the piston block 19. The piston carries a stem 25 which contacts with a second pivoted arm of the snap switch.

The piston 23 in the piston block 19 is operated in one direction by lubricant under pressure supplied to the block through a conduit 26 connecting the chamber 24 with the pipe system 7. The piston block further provides means for reducing the pressure of the lubricant in the pipe system, as more fully hereinafter described. The means for reducing the pressure in the pipe system is associated with the piston 23 and includes a port 27 leading from one side of the chamber 24 and connected by a conduit 28 to the crankcase above the normal level of the lubricant in the crankcase.

When it is desirable to lubricate the bearings of the motor vehicle, the operator simply pulls out the button 20 on the dash of the motor vehicle, thereby operating the snap switch so that the contact 17 is urged into engagement with the contact 18, as illustrated in Fig. 3, to complete the circuit between the battery and the motor. As the motor rotates, the eccentric 5 is in turn rotated and as it is connected with the piston 4 it reciprocates it in the lubricant chamber of the pump. During the back stroke of the piston, lubricant is drawn from the crankcase 3 through the pipe 6ª and past the valve 8 into the pump where it is forced out past the valve 9 in the pipe system 7 upon the return stroke of the piston 4. Normally the piston 10 and piston stem 11 in each of the lubricant-measuring and pressure-multiplying cups is in the position shown in Fig. 4, so that as the lubricant is pumped through the pipe system 7, it may pass around the pistons 10 into the chamber 14 of each cup, but not past the end 15 of the piston stem 11. When the chambers 14 are filled with lubricant, the pump 2 builds up a pressure in the pipe system 7 which is sufficient to move the pistons 10 so that they enter the chambers 14 and cut off the supply of lubricant thereto. During the stroke of the piston between closing the chamber 14 and opening the chamber 14 to the outlet passage 16 of the cup, the lubricant may pass by the cup leather until the reduced portion of the piston stem 11 connects the chamber 14 with the outlet passage 16 as more fully set forth in my co-pending application Serial No. 80,247 filed herewith. Thereafter the lubricant in the system 7 presses against the cup leather of the piston 10 and prevents further escape of lubricant. As the piston moves toward the outlet end of the chamber 14, it forces all the lubricant therefrom around the reduced portion of the piston stem past the wall 14ª and through the discharge passage 16 to the part to be lubricated.

During the time that the pistons 10 in the cups 1 are discharging lubricant, lubricant pressure in the system is at the same time acting upon the piston 23 and the piston block 19 to throw the switch and break the circuit between the contacts 17 and 18, thereby stopping the motor 5ª. The pressure required to throw the switch is not built up in the system until after all of the pistons 10 in the cups 1 have reached the ends of their strokes. After the switch has assumed the position shown in Fig. 1, the lubricant passing through the pipe 26 in the chamber 24 and the block 19, forces the piston 23 by the port 27 so that the lubricant may pass directly from the pipe 26 to the pipe 28 and into the crankcase 3. When the port 27 is open the lubricant is forced from the cups 1 by the springs 13, and the lubricant passes through the pipe system 7 and the pipes 26 and 28 back into the crankcase so that they may assume their normal position as shown in Fig. 4. Thus, the various parts of the lubricating system assume their normal position and are ready at any time to repeat the operation as described.

The pipe 6ª is connected to the crankcase 3 at a point above where it might draw enough lubricant from the crankcase to injure the motor.

From the above description it will be readily understood that I have provided a lubricating system which is simple in construction, positive in operation and automatically stops after a predetermined quantity of lubricant has been forced to each part to be lubricated.

The measuring cups disclosed in this application are claimed in my copending application Serial No. 235,492 and certain other features illustrated or described herein are claimed more specifically in my other copending applications.

While I have shown and described a preferred embodiment of my invention, it will be understood that changes involving omission, substitution, alteration and reversal of parts and even changes in the mode of operation may be made without departing from the scope of my invention which is best described in the following claims.

Claims:

1. A central lubricating system comprising, in combination, a plurality of lubricant supply cups each adjacent a bearing to be lubricated and having means therein to deliver a predetermined quantity of lubricant to their respective bearings, a supply reservoir, a power operated pump for withdrawing lubricant from said reservoir and forcing lubricant to said cups, a branched piping system connecting said pump with said cups, special means for controlling the operation of said pump, and lubricant operated means for actuating said control means to stop said pump when a predetermined quantity of lubricant has been discharged from said system.

2. A lubricating system comprising, in combination, a plurality of lubricant-measuring discharge cups, lubricant-measuring means associated with said cups for supplying a predetermined quantity of lubricant under pressure to parts to be lubricated, means normally preventing flow of lubricant beyond said cups, a motor driven pump for supplying the lubricant to said cups through a pipe system connecting all of said cups with said pump, and for operating the means associated with said cups, a supply reservoir connected with said pump for supplying lubricant thereto, valves located at the inlet and outlet passage of the pump for permitting passage of lubricant in one direction only and lubricant pressure operated means for stopping the action of the motor and releasing the pressure of the lubricant in the pipe system after the lubricant has been forced from all of said cups.

3. A central lubricating system, comprising an electric motor, a lubricant pump driven thereby, a source of lubricant for said pump, a plurality of lubricant measuring devices adjacent the bearing to be lubricated, a conduit system connecting said devices with said pump, a switch for controlling the operation of said motor, a cylinder having an inlet port connected to said conduit system and an outlet port communicating with said source, a piston reciprocable in said cylinder, resilient means operative to maintain said piston in position to prevent flow of lubricant from said conduit system to said source, manual means for closing said switch, and a lost motion connection between said piston and said switch whereby the latter may be suddenly opened upon a predetermined lubricant pressure in said conduit system.

4. A central lubricating system, comprising an electric motor, a lubricant pump driven thereby, a source of lubricant for said pump, a plurality of lubricant measuring devices adjacent the bearings to be lubricated, a conduit system connecting said devices with said pump, a by-pass from said conduit system to said source, and a control valve operable upon a predetermined pressure in said conduit system to open said by-pass and concurrently control the operation of said motor.

5. A central lubricating system, comprising an electric motor, a lubricant pump driven thereby, a source of lubricant for said pump, a plurality of lubricant measuring devices adjacent the bearings to be lubricated, a conduit system connecting said devices with said pump, and means operable upon a predetermined lubricant pressure in said conduit system concurrently to stop said motor and open a by-pass from said conduit system to said source.

6. A central lubricating system, comprising a motor, a lubricant pump driven thereby, a source of lubricant for said pump, a plurality of lubricant measuring devices adjacent the bearings to be lubricated, a conduit system connecting said devices with said pump, and means operable upon a predetermined pressure in said conduit to relieve the pressure therein and stop said motor.

7. A central lubricating system, comprising an electric motor, a lubricant pump driven thereby, a source of lubricant for said pump, a plurality of lubricant measuring devices adjacent the bearings to be lubricated, a conduit system connecting said devices with said pump, and means operable subsequent to operation of said measuring devices for permitting escape of lubricant from said conduit system and stopping said motor.

8. A central lubricating system, comprising a motor, a lubricant pump driven thereby, a source of lubricant for said pump, a plurality of lubricant measuring devices adjacent the bearings to be lubricated, a conduit system connecting said devices with said pump, and means operable after said measuring devices have expelled their charges of lubricant to their bearings for relieving the lubricant pressure in said conduit system and stopping said motor.

9. In a central lubricating system having power operated pump means for forcing lubricant to the parts to be lubricated, a lubricant pressure operated device for effecting automatic stopping of the operation of the pump means and reducing the pressure of the lubricant in the system, said lubricant pressure operated device including a cylinder having an inlet passage and an outlet passage, said inlet passage connected to the system and the outlet connected to the lubricant supply, a piston and piston stem normally pressed toward the inlet end of said system to close said outlet and operable by the pressure of the lubricant to automatically operate a device for discontinuing the supply of power to said pump and to open the outlet passage to permit lubricant to pass from the system back to the lubricant supply after the pump has been stopped.

10. A central lubricating system comprising a source of lubricant, metering devices each adjacent a bearing to be lubricated, pipes connecting said devices with said source, power means for withdrawing lubricant from said source and forcing it through said pipes to said devices, manual means for setting said power means in operation, and automatic means for stopping said power means when the pressure in said pipes reaches a predetermined degree, said automatic means giving both visual and audible signals.

11. A lubricating system comprising a source of lubricant, a plurality of cups each located adjacent a bearing to be lubricated, conduits connecting said cups with said source of supply, power operated means for forcing lubricant from said supply to said cups, and means for rendering said power means inoperative when the pressure in said conduits reaches a predetermined amount, said means serving also to indicate by signal that the bearings have been lubricated.

12. A central lubricating system comprising a lubricant supply reservoir, a pump, a plurality of lubricant cups for discharging lubricant to parts to be lubricated, conduit means connecting the supply reservoir, pump and cups, and a single control device operable to start and stop the pump and to bypass the lubricant from the conduit means back to said reservoir when operated to stop further operation of said pump.

13. A central lubricating system comprising a lubricant supply reservoir, a power operated pump, a plurality of lubricant cups for discharging lubricant to parts to be lubricated, conduit means connecting the supply reservoir, pump and cups and a centrally located combined pump control and lubricant pressure releasing device connected with the conduit means and with the means through which power is supplied to the pump.

14. In a central lubricating system, the combination of a souce of lubricant, a lubricant pipe system, a power operated pump for forcing lubricant from said source to said pipe system, means manually operable to control the supply of power to said pump, and means operable upon a predetermined pressure of the lubricant in said pipe system automatically to actuate said control means to cut off the supply of power to said pump.

15. In an automobile having an internal combustion engine and a driver's compartment, a central lubricating system for lubricating the chassis bearings of said automobile, said system comprising a source of lubricant supply, a motor driven pump receiving lubricant from said source of supply, pipes connecting said pump with the chassis bearings, lubricant measuring means in said pump, power operated means for driving said pump, means located outside of the driver's compartment and operable upon a predetermined pressure in said pipes to stop said pump, and manual means for starting said pump, said manual means having a part extending into the driver's compartment.

In testimony whereof, I have signed my name to this specification.

HOWARD J. MURPHY.